3,455,729
SILICON NITRIDE
Gerald G. Deeley, Bugbrooke, and John M. Herbert, Horton, England, assignors to The Plessey Company Limited, Ilford, Essex County, England, a British company
No Drawing. Filed Nov. 24, 1965, Ser. No. 509,597
Claims priority, application Great Britain, Nov. 27, 1964, 48,297/64
Int. Cl. C23c *13/02*
U.S. Cl. 117—106      6 Claims

ABSTRACT OF THE DISCLOSURE

For the purpose of resisting the tendency of silicon nitride bodies to fracture when subjected to thermal shocks the bodies are exposed to lithium oxide vapor for a period ranging typically from 3 to 200 hours while the temperature of the body is kept at a high temperature which may be 500° C. to 1500° C.

---

This invention relates to silicon nitride and relates more specifically to methods of reducing the tendency of silicon nitride bodies to fracture when subjected to rapid changes in temperature.

The present invention may for example be applied to silicon nitride bodies made by methods forming the subject of British Patent No. 970,639.

According to the present invention a pre-formed body of silicon nitride ceramic material is subjected to the vapour of lithium oxide for a sustained period of time and at an elevated temperature whereby to improve the thermal shock resistance of said body.

The resistance to thermal shock of silicon nitride bodies treated in accordance with the present invention has been found to be substantially improved compared with that of untreated bodies.

In carrying out the present invention the temperature of the oxidising atmosphere containing lithium may be at a temperature of 500° C. to 1500° C. whilst the period of time for which the silicon nitride body is subjected to the lithium oxide vapour may be from 3 to 200 hours.

For the purpose of obtaining lithium oxide vapour for treating the silicon nitride body lithium hydroxide may be heated, but it is to be understood that any other compounds of lithium may be used instead of lithium hydroxide provided the heating takes place in a normally moist atmosphere.

In carrying out the invention a porous refractory brick, as for example of alumina, which is saturated with a suitable solution of a lithium compound (e.g. lithium hydroxide) may be heated to produce oxide vapour with the silicon nitride body to be treated being located in close proximity to the brick.

By way of example the present invention will now be described as applied to improving the resistance to thermal shocks of silicon nitride ceramic material bodies.

The production of a silicon nitride ceramic material body usually involves the mixing of 0.1% to 25% by weight of a fluxing agent in powder form with powdered silicon nitride and then pressure sintering the mixture to convert the silicon nitride into ceramic form. The silicon nitride powder may itself be made as described in the examples given in the above British Patent No. 970,639.

(a) The nitriding of silicon metal powder at temperatures from 1300° C. to 1650° C.;

(b) The reaction of silicon chloride with ammonia or with mixtures of nitrogen and hydrogen at temperatures from 1300° C. to 1650° C.; or (c) The reaction of silicon chloride with ammonia at temperatures from −70° C. to 1300° C. followed by pyrolysis of the reaction product to form silicon nitride.

After the pressure sintering of the mixture to form a rough shaped body the body may be ground, as by the use of a diamond abrasive, in order to provide it with its requisite final shape and dimensions.

According to another manner of producing a silicon nitride body powdered silicon of 99.9% purity is converted to silicon nitride by heating it in a gas-tight furnace chamber for 24 hours at a temperature of 1360° C. with it then being heated for a further 24 hours at 1460° C. whilst ammonia gas is fed into the chamber during the heating. The silicon nitride product is then milled to a fine powder in a steel ball-mill and the steel contamination from the ball-mill is removed from the powder by leaching with dilute hydrochloric acid. After this magnesium oxide in the proportion of 4.9% by weight is intimately mixed with the silicon nitride powder in a ball-mill. The mixed powder is then placed in a carbon die fitted with sliding plungers and the die is heated to a temperature of 1850° C. while a pressure of 1.5 tons per square inch is applied to the plungers. This operation converts the mixed powder into a coherent strong rough-shaped body having a density of approximately 3.18 grams per cc. This body may be ground to give it its final shape and dimensions.

The silicon nitride body whatever shape it may take is then subjected to the surface treatment in accordance with the present invention. This treatment consists in subjecting the silicon nitride body to an oxidising atmosphere containing lithium. For this purpose the silicon nitride body is supported above a piece of porous alumina brick which has been saturated with a 2% solution of lithium hydroxide. The body and alumina brick are arranged in an alumina furnace which is heated to a temperature of 1300° C. for a long period. This period may range from 3 to 200 hours. The lithium oxide vapour generated contacts the surface of the silicon nitride body and produces a distinct whitening of the body surface layer the depth of penetration of which appears to be quite small.

In order to test the efficacy of the treatment according to the present invention to increase the resistance to thermal shock of silicon nitride bodies test pieces of tapered disc shape were subjected to thermal shock test cycles. It may here be mentioned that the shape of the test pieces was described by Glenny et al. in Powder Metallurgy, 1961, No. 8, page 167.

A table showing the results of heat shock tests applied to twenty-eight different samples of tapered disc shape test bodies is shown below.

TABLE.—RESULTS OF HEAT-TREATING THERMAL SHOCK SPECIMENS

| Specimen No. | Treatment period at 1,300°C. | No. of quenches survived |
|---|---|---|
| 1 | 100 | 100* |
| 2 | 100 | 100* |
| 3 | 100 | 100* |
| 4 | 100 | 100* |
| 5 | 100 | 9 |
| 6 | 100 | 100* |
| 7 | 10 | 2 |
| 8 | 10 | 10 |
| 9 | 10 | 24 |
| 10 | 30 | 70* |
| 11 | 30 | 70* |
| 12 | 30 | 10* |
| 13 | 100 | 44 |
| 14 | 200 | 60* |
| 15 | 100 | 100* |
| 16 | 200 | 60* |
| 17 | 200 | 10* |
| 18 | 200 | 10* |
| 19 | 200 | 10* |
| 20 | 200 | 10* |
| 21 | 100 | 100* |
| 22 | 100 | 10* |
| 23 | 100 | 10* |
| 24 | 100 | 0 |
| 25 | 100 | 10* |
| 26 | 100 | 0 |
| 27 | 100 | 10* |
| 28 | 100 | 10* |

The asterisk shown to the right of the figures in the righthand column of the table indicate that the particular specimen concerned was undamaged after the number of quenches mentioned. The results in the table compare extremely favourably with the results obtained from the testing of fifty-six specimens prepared in the same manner but not subjected to the surface treatment according to the present invention. Of these specimens nearly 60% fractured on the first quench while 16% survived ten quenches without fracture. Consequently, it can be demonstrated that the effect of the surface treatment according to the present invention clearly improves the resistance to shock of silicon nitride bodies. The particular thermal shock tests applied to the tapered disc specimens consists in heating the silicon nitride bodies to 1020° C. in a furnace and after heating them for about 10 minutes at this temperature the bodies are plunged into a bed of silicon carbide powder which is fluidised by an upward current of air. This is an extremely severe test which dense ceramic materials rarely survive even once without fracture but as the table illustrates bodies treated by the process of the present invntieon frequently survive such tests.

What we claims is:

1. A method of reducing the tendency of a pre-formed body of silicon nitride to fracture when subjected to rapid changes in temperature in which the body of silicon nitride ceramic material is subjected to vapour of lithium oxide for a sustained period of time at an elevated temperature.

2. The method as claimed in claim 1 in which the body is subjected to an oxidising atmosphere containing lithium at an elevated temperature of 500° C. to 1500° C.

3. The method as claimed in claim 1 in which the period of time to which the body is subjected to the lithium oxide vapour is from 3 to 200 hours.

4. The method as claimed in claim 1 in which the lithium oxide vapour is obtained by heating lithium hydroxide.

5. The method as claimed in claim 4, in which the lithium hydroxide is absorbed by a porous refractory brick located in close proximity to the silicon nitride body to be treated and the brick is heated for the generation of lithium oxide vapour.

6. The method as claimed in claim 5, in which a 2% solution of lithium hydroxide is used and the refractory brick is of alumina and is heated for the generation of lithium oxide vapour by heating it to about 1300° C. for a period of time of 3 to 200 hours.

References Cited

UNITED STATES PATENTS 3,226,194   12/1965   Kuntz _____ 117—106

J. STEINBERG, Primary Examiner

U.S. Cl. X.R.

23—191; 148—1.5, 1.6; 156—17